Patented May 27, 1924.

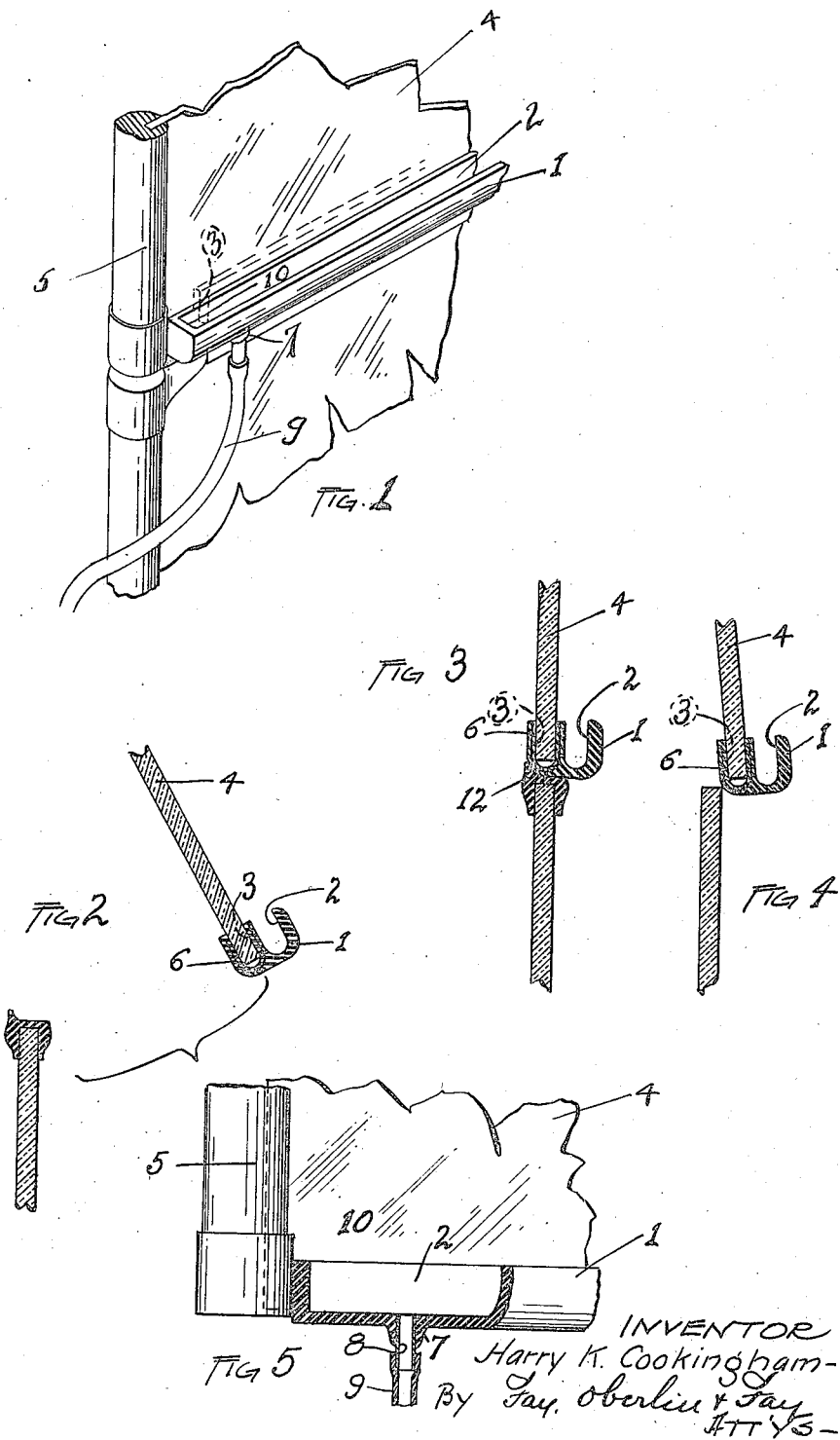

1,495,727

UNITED STATES PATENT OFFICE.

HARRY K. COOKINGHAM, OF CLEVELAND, OHIO.

DEVICE FOR VEHICLE WINDSHIELDS.

Application filed October 19, 1917. Serial No. 197,435.

*To all whom it may concern:*

Be it known that I, HARRY K. COOKINGHAM, a citizen of the United States, and a resident of Cleveland, county of Cuyahoga, and State of Ohio, have invented a new and useful Improvement in Devices for Vehicle Windshields, of which the following is a specification, the principle of the invention being herein explained and the best mode in which I have contemplated applying that principle, so as to distinguish it from other inventions.

The present invention, relating as indicated, to a device to be attached to windshields for vehicles, is more particularly concerned with the provision of a removable means for collecting water which may be thrown against the windshield along the bottom edge of the same and draining the same off to the end of the shield without permitting it to be blown inwardly upon the occupants of the vehicle. A further object of the invention is the provision of such a means which will be relatively simple and inexpensive in construction and readily removable from the windshield. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a view in perspective of a windshield to which my device is attached; Figure 2 is a transverse section of the same with the upper section open; Figure 3 is another transverse section showing the shield closed; Figure 4 is a transverse section of a windshield showing a modification of my device; and Figure 5 is a front elevation of my device in position on a windshield showing the device partially in section.

The general construction of my device can be readily seen from Figures 1 and 2. It is of course immaterial as to whether the device is formed as a separate unit and removably attached to the glass of the windshield, or whether it be formed either as a part of the windshield or formed separately and permanently attached to the windshield section. In Figure 1 the device is constructed to be removable from the glass of the shield and consists of a strip 1, formed preferably of flexible material, such as rubber, which is cored out to provide a trough 2, extending for the entire length of the strip. Along side of the trough 2 there is formed in the strip 1 a recess 3 of a size adapting it to snugly receive therein the edge of the glass 4 of the windshield 5 and to assist in maintaining the device on the shield. I preferably embed at various points along the length of the strip, resilient clips 6, which are adapted to normally maintain the upper edges of the slot 3 a lesser distance apart than the width of the glass, over which the sides of the strip are intended to engage. In this way the sides of the recess are maintained under constant pressure toward each other, and I have found that this pressure is sufficient to prevent the accidental removal of the strip, due to the jarring and vibration of the vehicle.

It often happens that the wind strikes the front of a vehicle at an angle to the direction of movement thereof and in such cases the rain drops at the one end of the shield are blown diagonally through the opening of the windshield onto the occupants of the vehicle. In order to prevent this movement of the water, which will collect in the trough, into the vehicle I provide an extension 7 from the bottom of one end of the trough, this extension being apertured as at 8 and being adapted to receive a conduit 9, which may be led around the outside of the windshield so that the water may be discharged against the sides of the curtains or the sides of the body at a point where it cannot be blown into the vehicle by the wind. The end of the trough is of course closed by a partition 10 and the water from the trough will all discharge through the drain 8 and conduit 9.

As the strip 1 is preferably formed of flexible material, such as rubber, it follows that when the upper section is closed against the lower, the strip 1 will engage against the upper edge of the lower section and will give sufficiently to take up any inequalities along the edge of the lower section, and thus provide a tight sealing means between the two sections, which is a great convenience in cold weather. Such action is clearly illustrated in Figure 4. Similarly, a flange 12 may be applied to the upper edge of the lower section and the strip 1 may be formed to engage thereagainst, as is shown in Figure 3, in the same manner that the glass itself is brought against such a strip in some types of windshields now in use.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In combination, a windshield comprising two spaced shield sections and an elastic, flexible weather strip positioned between the adjacent edges of said sections; and clips bent U-shape gripping one of the sections for fastening the strip in position thereon, the bent portions of the clips being imbedded in the strip.

2. The combination of two windshield sections, a trough containing member of resilient material provided with a recess adjacent the trough and of like cross-section thereto adapted to receive therein the edge of one of said sections, a second resilient member having a similar recess to receive the edge of said second windshield section, said second member having a flange and being adapted to form a tight joint with said first member when the windshield sections are closed, spaced resilient clips imbedded in the recess of said upper member to hold it tightly on said section, an apertured extension spaced from one end of said trough at the bottom thereof, and a conduit connected with said extension for discharging the water accumulating in said trough at a distant point.

Signed by me, this 17th day of October, 1917.

HARRY K. COOKINGHAM.